3,398,003
SILVER POLISH-TARNISH RETARDER CONTAINING A DIALKYL DISULFIDE HAVING FROM 8 TO 20 CARBON ATOMS IN EACH ALKYL RADICAL

Verle C. Smith, 1532 E. 36th Place 74105, and James H. Carpenter, 4623 E. 57th St. 74135, both of Tulsa, Okla.
No Drawing. Filed Apr. 26, 1965, Ser. No. 451,070
8 Claims. (Cl. 106—3)

ABSTRACT OF THE DISCLOSURE

A silver polish and tarnish retarding compound incorporates dialkyl disulfide having the general formula R—S—S—R where R is an alkyl radical having from 8 through 20 carbon atoms.

---

This invention relates to a silver polish. More particularly, this invention relates to a composition of matter useful as a silver polish and tarnish retarder. Still more particularly, this invention relates to a composition of matter including an abrasive compound and a silver surface protectant. Still more particularly, this invention relates to a silver polish and tarnish retarder containing an abrasive material and an organic sulphur compound.

The clean shiny surface of silverware rapidly darkens or tarnishes upon exposure to the atmosphere, presumably the result of the reaction of silver atoms at the surface with various sulphur containing compounds in the atmosphere. Historically the method of restoring silverware to its previous shiny condition has been to apply an abrasive material to the surface to wear away the darkened portions of the surface.

The primary object of this invention is to provide a composition which will retard the formation of tarnish.

Another object of this invention is to provide a composition in which a polishing agent and a tarnish retarder may be applied to the silver surface at the same time.

Still another object of this invention is to provide a means for protecting the surface of freshly polished silverware by the application of a protecting agent while the polishing operation is going on.

Further objects and advantages of the invention will become apparent from the following description and claims.

The tarnish retarding compound of this invention is a dialkyl disulfide having the general formula R—S—S—R where R is an alkyl radical having from eight through twenty carbon atoms. The tarnish retarding chemical is preferably compounded with a polishing or cleaning material, such as an abrasive. Other ingredients may be added to the composition to aid in the cleaning and polishing action, to assist in the application of the composition to the surface to be polished, to assist in the removal of tarnish or old composition from the surface, to provide a stable product, and to provide a product having an esthetic appeal to the consumer. For example, the composition may include any one or more of the following: a suspending agent such as a detergent; a surface active agent, or emulsifier; an odorant; a diluent, either liquid or solid; a coloring agent; or an abrasive; as well as the tarnish retarding compound itself.

The preferred abrasives are diatomaceous earth, precipitated calcium carbonate, prepared chalk, and whiting. However, other abrasives are well known in the art and may be preferred for certain types of cleaning operations or because the abrasives themselves have distinctive properties. Bentonite, montmorillonite, or similar materials can be used because a material of this class can serve as both an abrasive and a suspending agent.

Any well known suspending agent including surface active agents and emulsifiers may be used; polyethylene glycol and dimethylpolysiloxane are preferred.

The diluent may be a liquid such as water or a low molecular weight organic compound such as methyl alcohol, ethyl alcohol, or propyl alcohol.

In the removal of the tarnish from the surface of the silverware, the abrasive removal is apparently aided by the complexing of the dialkyl disulfide with the tarnish products. Then, an additional portion of the dialkyl disulfide complexes with the silver atoms at the surface of the silverware to permit the formation of a protective shield over the surface of the silverware. Theoretically the sulfur portion of the disulfide molecule is adjacent to the metal surface and the large organic portion of the molecule forms a shield between the metal surface and the atmospheric contaminants. The protective surface coating seems to be practically impervious to the atmosphere, to resist removal by common cleaning agents, to resist removal by strong chemical agents, and to resist removal by normal household use.

The dialkyl disulfide compounds of this invention are known in the chemical literature. The preparation of the dialkyl disulfides may readily be accomplished by the reaction of a corresponding alkyl halide with thiourea, followed by the basic hydrolysis of the resulting s-alkyl thiouronium salts to form the alkyl mercaptan, which is subsequently oxidized by aqueous iodine to give the desired disulfide. The basic hydrolysis is performed by adding 1.5 moles of sodium hydroxide per mole of the starting halide compound. Generally, the overall yield in these reactions is above 80% based on the starting material. The reaction of the alkyl mercaptan with aqueous iodine is quantitative. In this general method of synthesis of the dialkyl disulfides, the yield of disulfide will generally be considerably better when straight chain alkyl compounds are used than it would be with branched chain hydrocarbons. And the yield of disulfide prepared from branched chain alkyl compounds will depend, as to be expected, upon the length of the side chain and the position of the side chain. Generally, a simple branched chain alkyl compound such as one having a methyl group in the omega position will be easier to prepare than a compound having a larger chain closer to the disulfide grouping. A typical branched chain mercaptan used to prepare the disulfide is ω-methyldodecyl mercaptan. Branched chain disulfides have been prepared by the method disclosed by V. V. Ritter and E. D. Sharpe, JACS, 59, 2351 (1937), in which they prepared di-iso-amyl disulfide by oxidizing isoamyl mercaptan with hydrogen peroxide solutions.

Of course, the method of synthesis is also applicable where an asymmetric disulfide is desired since the starting product could be composed of a mixture of two or more distinct alkyl halides. For example, a product comprising largely n-octyl-n-tetradecyl disulfide is prepared by oxidizing with an aqueous iodine solution a mixture of n-octyl mercaptan and n-tetradecyl mercaptan. Where an asymmetric disulfide is prepared the final product will also contain the symmetrical disulfides to varying degrees, as, in the aforesaid example, both di-n-octyl disulfide and di-n-tetradecyl disulfide will be present.

A typical general formulation for the silver polish-tarnish retarder is:

| | Percent by weight |
|---|---|
| Alkyl disulfide | 1–20 |
| Abrasive | 10–80 |
| Odorant | 0–20 |
| Diluent | 0–89 |
| Suspending agents | 0–30 |

The superior tarnish retarding ability of the composition of this invention in comparison to commercially available non-tarnish retarding silver polishes was displayed vividly during a prolonged testing program. Two types of tests were conducted, first, a series of tests in which the treated silverware was subjected to prolonged atmospheric exposure and, second, a series in which the comparisons were made under accelerated exposure conditions.

In the tests demonstrating prolonged protection to atmospheric conditions, an article of silverware was cleaned with a commercial silver polish and exposed to the atmosphere in an identical manner to that by which a silverware article treated with the tarnish retarding composition of this invention was exposed. In this series of tests, the composition by weight of the tarnish retarding alkyl disulfide was maintained at 5%, but various disulfides were employed. The silverware was treated in exactly the same manner in each test and identical articles were treated.

In the accelerated exposure tests, varying concentrations of different disulfides were used by comparison both with the commercial polish and for the purposes of correlating the results of an accelerated test with the results of a prolonged test. The cleaned and polished silverware was subjected to a solution of sulfurated lime, N.F., for thirty seconds. Then the articles were removed and observed. The accelerated exposure test compares approximately with an atmospheric exposure of about at least one year.

PROLONGED EXPOSURE TESTS

In each test two articles of silverware are washed with soap and water, rinsed with hot water, and dried with a towel. One of the articles was polished with a commercially available, non-tarnish retarding silver polish. The other article was polished with a tarnish-retarding composition of this invention having the composition indicated. After treating, each article was again washed with soap and water, rinsed with hot water, and dried with a towel. Then the articles were allowed to remain undisturbed and exposed to the atmosphere, in a room heated by a gas burner, and were observed periodically.

Example I

One article of silverware was treated with a commercial silver polish as described above and another was treated with a silver polish-tarnish retarder having the composition:

| | Grams |
|---|---|
| Di-n-tetradecyl disulfide | 5 |
| Prepared chalk | 20 |
| Polyethylene glycol 4000 | 4 |
| Dimethylpolysiloxane 100 centistokes | 2 |
| Rose water | 69 |

The articles were allowed to stand as set out above. The article treated with the commercial silver polish tarnished in about two weeks. The article protected by the composition of this invention developed a very slight tarnish in forty-two days.

Example II

One article was treated with a commercial silver polish as described above. Another article was treated with a silver polish-tarnish retarder having the composition as follows:

| | Grams |
|---|---|
| Di-n-octadecyl disulfide | 5 |
| Prepared chalk | 20 |
| Polyethylene glycol 4000 | 4 |
| Dimethylpolysiloxane 100 centistokes | 2 |
| Rose water | 69 |

The articles were allowed to stand as set out above. The article treated with the commercial silver polish tarnished in two weeks. The article protected by the composition of this invention developed a few slight spots of tarnish in about four months and twelve days.

ACCELERATED EXPOSURE TESTS

In each test two articles of silverware were washed with soap and water, rinsed with hot water, and dried with a towel. One of the articles was polished with a commercially available, non-tarnish retarding silver polish. The other article was polished with a tarnish-retarding composition of this invention having the composition indicated. After treating, each article was again washed with soap and water, rinsed with hot water, and dried with a towel. The articles were then placed in a saturated solution of sulfurated lime for thirty seconds, then removed and placed on a paper towel.

Example I

One article of silverware was treated with a commercial silver polish as set forth above and another with a silver polish-tarnish retarder having the following composition:

| | Grams |
|---|---|
| Di-n-tetradecyl disulfide | 1 |
| Prepared chalk | 20 |
| Polyethylene glycol 4000 | 4 |
| Dimethylpolysiloxane 100 centistokes | 2 |
| Rose water | 73 |

The article treated with the commercially available silver polish tarnished immediately with an extremely dark tarnish. The article protected by the tarnish-retarder of this invention developed only a slight tarnish.

Example II

One article of silverware was treated with a commercial silver polish as set forth above and another article was treated with a silver polish-tarnish retarder having the following composition:

| | Grams |
|---|---|
| Di-n-tetradecyl disulfide | 20 |
| Prepared chalk | 20 |
| Polyethylene glycol 4000 | 4 |
| Dimethylpolysiloxane 100 centistokes | 2 |
| Rose water | 54 |

The article treated with the commercially available silver polish tarnished immediately with an extremely dark tarnish. The article protected by the tarnish retarder of this invention developed only a very slight tarnish. This example using the 20% formulation gave somewhat better protection than the 1% formulation of Example I.

Example III

One article of silverware was treated with a commercial silver polish as set forth above and another article was treated with a silver polish-tarnish retarder having the following composition:

| | G. |
|---|---|
| Di-n-octadecyl disulfide | 1 |
| Prepared chalk | 20 |
| Polyethylene glycol 4000 | 4 |
| Dimethylpolysiloxane 100 centistokes | 2 |
| Rose water | 73 |

The article treated with the commercially available silver polish tarnished immediately with an extremely dark tarnish. The article protected by the tarnish retarder of this invention developed only a slight tarnish.

Example IV

One article of silverware was treated with a commercial silver polish as set forth above and another was treated with a silver polish-tarnish retarder having the following composition:

| | G. |
|---|---|
| Di-n-octadecyl disulfide | 20 |
| Prepared chalk | 20 |
| Polyethylene glycol 4000 | 4 |
| Dimethylpolysiloxane 100 centistokes | 2 |
| Rose water | 54 |

The article treated with the commercially available silver polish tarnished immediately with an extremely dark tarnish. The article protected by the tarnish retarder of this invention developed only a very slight tarnish. This example, using the 20% formulation, gave somewhat better protection than the 1% formulation of Example III.

Example V

One article was treated with a commercial silver polish as set forth above and another was treated with a silver polish-tarnish retarder having a composition as follows:

| | G. |
|---|---|
| Di-n-octyl disulfide | 5 |
| Prepared chalk | 20 |
| Polyethylene glycol 4000 | 4 |
| Dimethylpolysiloxane 100 centistokes | 2 |
| Rose water | 69 |

The article treated with the commercially available silver polish tarnished immediately with an extremely dark tarnish. The article protected by the tarnish retarder of this invention tarnished only slightly.

The tests and examples clearly indicate that the silver polish-tarnish retarder of this invention positively provides a strongly adhering protective surface on the silver articles which gives long-lasting protection against tarnish inducing atmospheres.

We claim:
1. A silver polish-tarnish retarder consisting essentially of:
   a disulfide having the structure R—S—S—$R_1$ wherein R and $R_1$ are alkyl groups having from 8 to 20 carbon atoms, said disulfide being present in an amount of from 1 to 20% by weight,
   an abrasive present in an amount of from 10 to 80% by weight,
   an odorant present in an amount of from 0 to 20% by weight,
   a diluent present in an amount of from 0 to 89% by weight, and
   a suspending agent present in an amount of from 0 to 30% by weight.
2. A silver polish-tarnish retarder as described in claim 1 wherein:
   R and $R_1$ are identical straight chain alkyl groups.
3. A silver polish-tarnish retarder as described in claim 2 wherein:
   said disulfide is a di-n-alkyl selected from the group consisting of:
      di-n-octyl disulfide
      di-n-tetradecyl disulfide, and
      di-n-octadecyl disulfide.
4. A silver polish-tarnish retarder as described in claim 3 wherein:
   said di-n-alkyl disulfide is present in an amount of 5% by weight,
   said abrasive is prepared chalk present in an amount of 20% by weight,
   said suspending agent includes polyethylene glycol 4000, 4% by weight and dimethyl-polysiloxane 100 centistokes, 2% by weight, and
   said diluent is rose water present in an amount of 69% by weight.
5. A method of retarding the tarnishing of a silver surface comprising the step of coating said silver surface with a disulfide having the structure R—S—S—$R_1$ wherein R and $R_1$ are alkyl groups having from 8 to 20 carbon atoms.
6. A method of retarding the tarnishing of a silver surface as described in claim 5 wherein:
   R and $R_1$ are identical straight chain alkyl groups.
7. An article of manufacture having a surface of silver wherein said silver surface is coated with a tarnish retarding composition consisting essentially of a disulfide having the structure R—S—S—$R_1$ wherein R and $R_1$ are alkyl groups having from 8 to 20 carbon atoms.
8. An article of manufacture as described in claim 7 wherein:
   R and $R_1$ are identical straight chain alkyl groups.

References Cited

UNITED STATES PATENTS 3,352,695   11/1967   Iaciofano _____ 106—5

JULIUS FROME, *Primary Examiner.*

J. B. EVANS, *Assistant Examiner.*